Oct. 28, 1947.   E. O. MERLINE   2,429,837
FRICTION CLUTCH
Filed Sept. 4, 1945

INVENTOR.
Edward O. Merline
BY
Gerald F. Baldwin
Attorney.

Patented Oct. 28, 1947

2,429,837

UNITED STATES PATENT OFFICE 2,429,837

FRICTION CLUTCH

Edward O. Merline, Detroit, Mich., assignor to Norman L. Boxwell, Detroit, Mich.

Application September 4, 1945, Serial No. 614,227

1 Claim. (Cl. 192—68)

This invention relates to improvements in friction clutches. It is an object of the invention to provide a friction clutch wherein a compression plate is forced against one face of a pulley by axial movement of a collar forming part of a conventional shifter mechanism, and floating dogs are provided in slots formed in a hub integral with the compression plate to engage the bore of the collar and prevent its axial movement, and thus retain the plate in frictional driving engagement with the pulley, until the shifter mechanism is operated to move the collar out of engagement with the dogs.

Another object of the invention is to provide such a friction clutch wherein the floating dogs are mounted in radial slots formed in the hub, and means are provided for rocking the dogs so that portions of their edges may be projected farther outwardly to engage the bore of larger collars or collars which have become worn.

A further object of the invention is to provide such a friction clutch wherein the inner edges of the dogs in all rocked positions bear against a shank on which the compression plate is mounted thereby insuring that sufficient frictional contact is maintained at all times between the dogs and the bore of the collar when the shifter mechanism is in operating position.

Yet another object of the invention is to provide a friction clutch wherein the degree of outward projection of the dogs is regulated by a nut in threaded engagement with one end of the shank on which the compression plate is mounted.

Having thus briefly stated some of the objects and advantages of the invention I will now describe it in detail with the aid of the accompanying drawing, in which.

Figure 1:
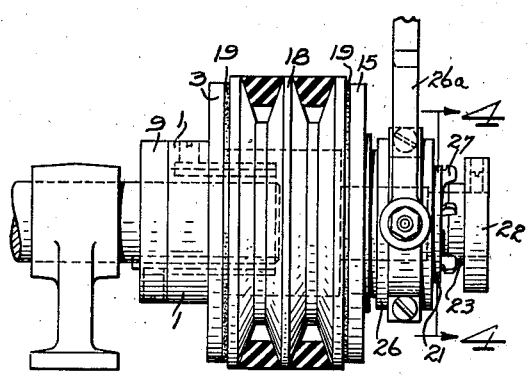
Figure 1 is a side elevation of the clutch.
Figure 2:
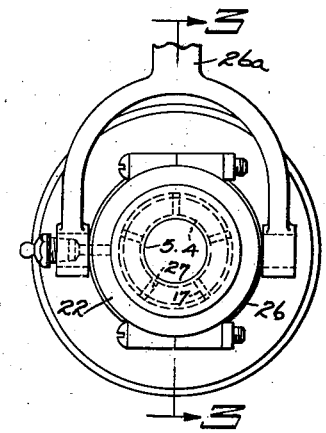
Figure 2 is an end view thereof.

Referring to the drawing, I designates a driving hub having a central bore 2 extending from one extremity and an annular compression flange 3 integral therewith around its bored portion. Integral with and extending coaxially from the closed end of the driving hub I is a shank 4 of reduced diameter which terminates in a threaded extremity of still smaller diameter. The bore of the driving hub is preferably made relatively large and is provided with a keyway 6 to receive a key 7 which engages a slot 8 formed in the outer periphery of an adapter 9 the bore of which is also longitudinally slotted at 10 for a key 11 which engages a slot 12 in a drive shaft 13. Thus by use of an adapter of the correct size the driving hub I may be mounted on various sized drive shafts.

Mounted on the drive shaft 4 for axial movement thereon is a compression plate 15 and integral with the side of the latter remote from the pressure flange 3 is a hub 16. Formed through the latter and the compression plate 15 is a keyway 16a to receive a key 4a seated in a slot 4b in the shank 4. Provided also through the hub 16 are a plurality of radial slots 17 in each of which a floating dog 27 is provided. A pulley 18 is freely mounted on the cone 1 between the compression flange 3 and the compression plate 15, and between each of the latter and the pulley an annular friction disc 19 is arranged. 18a denotes a suitable bushing pressed into the pulley to contact the periphery of the driving hub 1. Formed around the outer periphery of the hub 16 at its outer end is an open-ended annular slot 20 having a ring 21 pressed therein. The outer diameter of the ring is the same as that of the hub 16 but the said ring projects somewhat beyond the end of the hub. In engagement with the threaded extremity 5 of the shank 4 is an adjusting nut 22 having an inward annular projection 23 thereon the outer diameter of which is somewhat greater than that of the shank 4. Extending radially through the nut 22 is a tapped hole 24 to receive a set screw 25 which is tightened into engagement with the threaded extremity 5 to prevent accidental rotation of the said nut. Mounted for axial movement on the hub 16 is a collar 26 which is engaged by a conventional shifter yoke 26a employed for moving the collar 26 and the compression plate 15 axially so that the pulley is engaged between the latter and the compression flange 3 and rotated.

Figure 3:
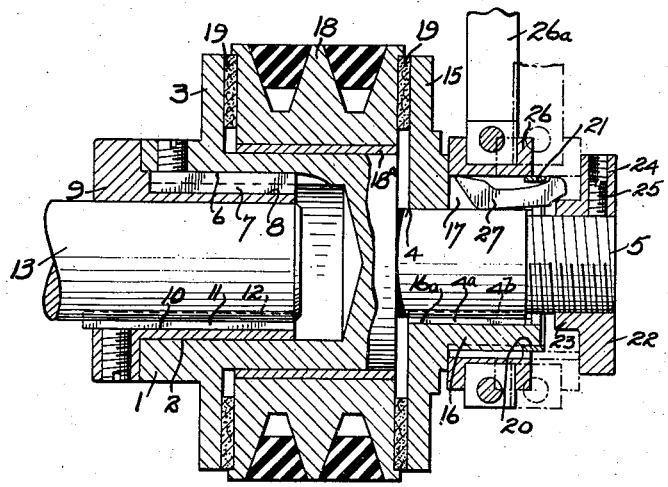
Figure 3 is a section on the line 3—3 of Figure 2.
Figure 4:
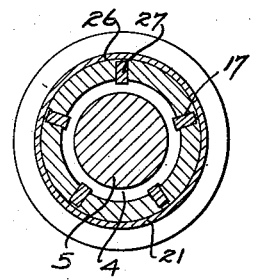
Figure 4 is a section on the line 4—4 of Figure 1.
Figure 5:
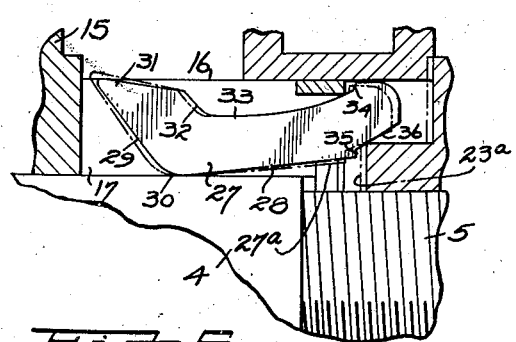
Figure 5 is an enlarged view showing the operation of one of the dogs.

The purpose of the dogs 27 is to engage the collar 26 and prevent movement of the flange 15 away from the pulley 18 while the latter is thus engaged for driving. The dogs have substantially flat inner faces 28 for the major portion of their length and their ends 29 adjacent the compression plate 15 are preferably outwardly inclined toward the latter from their inner faces. A slight radius is usually formed at the junctions of the faces 28 with the ends 29 to form heels 30. The outer faces of the dogs are inwardly inclined from the ends 29 to form toes 31, and at the inner ends of the toes inwardly inclined steps 32 are provided from the bases of which the intermediate portions 33 of the outer faces are outwardly inclined. At the opposite extremities the intermediate portions are outwardly stepped at 34 to form stops to coact with the outer face of the ring 21 and thus limit the movement of the dogs toward the compression plate 15. On the inner faces 28 of the dogs toward their ends remote from the compression plate outward steps 35 are formed and from these steps outwardly inclined faces 36 extend to the adjacent ends of the dogs. The steps 34 and 35 are substantially opposite one another. The outwardly inclined intermediate portions 33 toward the steps 34 are utilized somewhere along their length to contact the outer peripheral margin of the ring 21, however the distance of these contacts from the steps 34 is determined by the position of the annular projection 23 of the nut 22 which similarly engages the inclined faces 36 of the dogs. For instance inward adjustment of the nut 22 to move its projection 23 to the position indicated at 23a in Figure 5 moves the dogs 27 on their heels 30 to the position shown at 27a. The steps 36 form positive abutments to contact the projection 23 and limit the outward movement of the dogs. It will thus be seen that by movement of the nut 22 the dogs may be adjusted to engage the bore of the collar 26, which therefore need not conform to very close limits; and in thus manner the dogs may be adjusted to firmly engage the bore of the collar 26 when it is moved to the left (Figure 3) even after the latter becomes somewhat worn. Thus movement of the shifter yoke 26a to the left forces the compression plate 15 into firm engagement with the pulley 18 the opposite face of which is then in firm frictional engagement with the compression flange 3 and the engagement of the dogs 27 with the collar 26 prevents accidental movement of the latter toward released position—to the right Figure 3.

While in the foregoing the preferred embodiment of the invention has been described and shown, it is understood that alterations and modifications may be made thereto provided the said alterations and modifications fall within the scope of the appended claim.

What I claim is:

A friction clutch, including a driving member having a compression flange thereon, a pulley freely mounted for rotation about said driving member, a shank of reduced diameter extending axially from the driving member, a compression plate having a hub mounted for axial sliding movement on the shank, a collar keyed to said hub for axial sliding movement adapted to engage the compression plate and urge said plate against one face of the pulley so as to grip the latter between said plate and compression flange, said hub being provided with a series of circumferentially spaced apart longitudinal slots extending inwardly from the end of said hub and terminating adjacent said compression plate, a dog mounted in each of said slots having a toe portion and a heel portion, said toe portion being adapted to frictionally and yieldingly engage the inner periphery of the collar to hold the same in engagement with the compression plate, a ring encircling the hub engaging the dogs adjacent the heel portions thereof to provide a fulcrum point for each of said dogs, said dogs being notched at the point of engagement with said ring to retain the dogs in position, and a nut threaded on the free end of said shank having a projection engageable with a second notch in each of said dogs disposed substantially opposite said first mentioned notches, whereby axial movement of said nut will rock said dogs about their common fulcrum points and adjust the toe ends of said dogs radially to take up wear between said toe ends and the inner periphery of said collar.

EDWARD O. MERLINE.

REFERENCES CITED

The following references are of record in the file of this patent:

UNITED STATES PATENTS

| Number | Name | Date |
| --- | --- | --- |
| 2,070,065 | Pearmain | Feb. 9, 1937 |